(12) United States Patent
Ernst et al.

(10) Patent No.: US 9,752,632 B2
(45) Date of Patent: Sep. 5, 2017

(54) SPRAY POWDER WITH A SUPERFERRITIC IRON-BASED COMPOUND AS WELL AS A SUBSTRATE, IN PARTICULAR A BRAKE DISK WITH A THERMAL SPRAY LAYER

(71) Applicant: Oerlikon Metco AG, Wohlen, Wohlen (CH)

(72) Inventors: Peter Ernst, Stadel b. Niederglatt (CH); Alexander Barth, Wohlen (CH)

(73) Assignee: OERLIKON METCO AG, WOHLEN, Wohlen (CH)

( * ) Notice: Subject to any disclaimer, the term of this patent is extended or adjusted under 35 U.S.C. 154(b) by 484 days.

(21) Appl. No.: 13/859,216

(22) Filed: Apr. 9, 2013

(65) Prior Publication Data
US 2013/0295375 A1 Nov. 7, 2013

(30) Foreign Application Priority Data
Apr. 11, 2012 (EP) .................................... 12163790

(51) Int. Cl.
| | | |
|---|---|---|
| C22C 38/00 | (2006.01) | |
| C23C 4/06 | (2016.01) | |
| B32B 15/01 | (2006.01) | |
| F16D 65/12 | (2006.01) | |
| C22C 33/02 | (2006.01) | |
| C23C 28/00 | (2006.01) | |
| C22C 21/02 | (2006.01) | |
| C22C 38/02 | (2006.01) | |
| C22C 38/04 | (2006.01) | |
| C22C 38/44 | (2006.01) | |
| C22C 38/48 | (2006.01) | |
| C22C 38/22 | (2006.01) | |
| C23C 4/067 | (2016.01) | |
| B22F 3/115 | (2006.01) | |

(52) U.S. Cl.
CPC .......... *F16D 65/125* (2013.01); *B32B 15/012* (2013.01); *B32B 15/015* (2013.01); *C22C 21/02* (2013.01); *C22C 33/0285* (2013.01); *C22C 38/02* (2013.01); *C22C 38/04* (2013.01); *C22C 38/22* (2013.01); *C22C 38/44* (2013.01); *C22C 38/48* (2013.01); *C23C 4/06* (2013.01); *C23C 4/067* (2016.01); *C23C 28/321* (2013.01); *C23C 28/324* (2013.01); *B22F 3/115* (2013.01); *Y10T 428/26* (2015.01)

(58) Field of Classification Search
CPC .............................................. Y10T 428/12139
USPC ................... 420/67–69; 428/564; 188/218 R
See application file for complete search history.

(56) References Cited

U.S. PATENT DOCUMENTS

| | | | |
|---|---|---|---|
| 4,180,622 A * | 12/1979 | Burkhard et al. ............. 428/564 |
| 4,822,689 A | 4/1989 | Fukubayashi et al. |
| 5,407,035 A | 4/1995 | Cole et al. |
| 6,334,977 B1 | 1/2002 | Matsui |
| 2003/0121906 A1* | 7/2003 | Abbott et al. ................. 219/543 |
| 2003/0180565 A1* | 9/2003 | Herbst-Dederichs .......... 428/553 |
| 2006/0165552 A1* | 7/2006 | Kapoor .............. B23K 35/0261 |
| | | | 420/70 |
| 2011/0293849 A1 | 12/2011 | Lembach et al. |
| 2012/0017805 A1 | 1/2012 | Jordan et al. |
| 2013/0071647 A1 | 3/2013 | Mayr |

FOREIGN PATENT DOCUMENTS

| | | | |
|---|---|---|---|
| CN | 1287518 | 3/2001 | |
| CN | 101631888 | 1/2010 | |
| DE | 4321713 A1 | 1/1994 | |
| DE | 102009008114 A1 | 8/2010 | |
| DE | 102009029697 | 3/2011 | |
| JP | H04-45254 | 2/1992 | |
| JP | H05-320701 | * 12/1993 | ................ B22F 1/00 |
| WO | 97/03776 A1 | 2/1997 | |

OTHER PUBLICATIONS

EP Search Report for Patent Application EP 12163790, Jul. 13, 2012.
Japanese Office Action dated Oct. 27, 2016 issued in Application No. 20130-020231.

* cited by examiner

Primary Examiner — Humera Sheikh
Assistant Examiner — Lucas Wang
(74) Attorney, Agent, or Firm — Greenblum & Bernstein, P.L.C.

(57) ABSTRACT

The invention relates to a spray powder with a superferritic iron-based compound for the thermal coating of a substrate, wherein the spray powder includes, apart from impurities, a chemical list from the list of chemical elements consisting of C, Mn, Cr, Mo, Ni, Nb, P, S, Si, Fe, Al, O, and Zr. In accordance with the invention, the spray powder has the following chemical composition: C at a maximum up to 0.7% by weight, Mn at a maximum up to 0.7% by weight; Ni at a maximum up to 0.5% by weight, Nb at a maximum up to 1.2% by weight, P at a maximum up to 0.1% by weight, S at a maximum up to 0.1% by weight, Si at a maximum up to 0.2% by weight, Cr in the range from 20% to 40% by weight, Mo in the range 2.0% to 6% by weight, and a ceramic component $Al_2O_3/ZrO_2$ up to a maximum of 50% by weight, with the remainder being Fe, and otherwise a total of a maximum of 0.4% by weight of further chemical components being contained as impurities. The invention furthermore relates to a substrate, in particular to a brake disk, having a superferritic thermal spray layer.

18 Claims, No Drawings

SPRAY POWDER WITH A SUPERFERRITIC IRON-BASED COMPOUND AS WELL AS A SUBSTRATE, IN PARTICULAR A BRAKE DISK WITH A THERMAL SPRAY LAYER

The present application claims priority under 35 U.S.C. §119 of European Patent Application No. 12163790.4 filed on Apr. 11, 2012, the disclosure of which is expressly incorporated by reference herein in its entirety.

The invention relates to a spray powder made from a superferritic iron-based compound for the thermal coating of a substrate, in particular for the thermal coating of a brake disk of a vehicle, as well as to a substrate, in particular to a brake disk with a thermal spray layer, including a superferritic iron-based compound in accordance with the preamble of the independent claims.

Coatings applied by thermal spraying have long been known for a plurality of applications. Surfaces of oil lubricated cylinder running surfaces in vehicle engines have thus already been coated inter alia by thermal plasma spraying for some time, for example, with the layer above all considerably reducing the coefficient of friction which is operative between the piston rings and the cylinder wall so that the wear of the piston rings and of the cylinder is considerably reduced, which results in an increase in the operational performance of the engine, in an extension of the service intervals, for example an oil change, and not least in a noticeable increase in engine performance.

Further typical applications for surfaces applied by thermal spraying are the coating of turbine parts with wear protection layers and thermal barrier layers, the coating of components of bearings with oil lubrication or dry lubrication such as the coating of crank bearings other workpieces which are subjected to particular physical, chemical or thermal loads. Depending on the purpose the layer has to satisfy, very specific materials are used as a rule in the form of spray powders or spray wires which have the required specific properties and composition to generate the required properties of the surface layer to be sprayed.

Another application example is the provision of a friction surface on a substrate which actually serves the converse purpose and is intended to adjust the friction between the substrate and a friction partner which can be brought into contact with the substrate into an ideal range, with the substrate itself simultaneously being protected against wear and damage.

It is thus e.g. already known from DE 43 21 713 A1 to provide brake disks for vehicles with a thermal spray layer in order, on the one hand, to increase the braking effect on the braking of the vehicle and simultaneously to protect the substrate, that is the brake disk itself, from direct wear and thus not least to increase the service life of the brake disk.

In this respect, the demands on the brake systems have continuously increased over the past years, in particular in automotive construction, but also e.g. in the aeronautical sector. The brake systems also have to be able to brake relatively heavy vehicles or aircraft in a controlled and reliable manner, additionally also from high speeds and under adverse conditions such as aquaplaning. This makes high demands e.g. on the adhesive tensile strength of the friction coatings on the brake disks, but also on physical characteristics such as the microhardness and the macrohardness, the thermal stability of the properties, the thermal conductivity of the friction linings, etc. In this respect, for economic reasons alone, the friction layers should be able to be manufactured relatively simply and with established methods where possible and the chemical composition of the material to be used for the layers should be of a simple structure, should be composed of materials which are as easily obtainable and inexpensive as possible and should be able to be manufactured with a comparatively small effort. In addition, the friction layers should simultaneously have a high service life, that is should have as little mechanical wear as possible in operation and should beside also be sufficiently resistant to the very high development of heat on braking and should also be resistant as possible to chemical attacks such as corrosion so that long service intervals or replacement intervals can be realized.

The solutions known from the prior art can in this respect as a rule always only optimize a specific aspect or at most some few of the aforesaid aspects, with compromises having to be made in other properties.

To be able to compensate these disadvantages at least in part, coating processes have been proposed which are in part very complex and use complicated layer systems on the brake disks. A brake disk is thus proposed in DE 10 2009 008 114 A1 with a tungsten carbide based coating, with the tungsten carbide coating applied by means of a thermal spray process having to be posttreated by means of carburizing, oxidizing, gas nitrocarburizing or another gas-based or plasma-based process.

The posttreatment is in this respect absolutely necessary to achieve a hardening of the friction surface close to the surface in that a wear-resistant surface layer hardened to be resistant toward corrosion is formed by the diffusing in of the atoms from the plasma phase or gas phase.

This process is naturally very complex and/or expensive since the thermal coating of the brake disks necessarily has to be followed by a gas treatment process, which makes the manufacture unnecessarily complicated and expensive.

It is therefore the object of the invention to provide a thermal spray powder for the thermal coating of a substrate with which thermally sprayed layers can be manufactured using thermal spraying processes known per se, said thermally sprayed layers being able to be provided particularly advantageously as friction layers on brake disks, for example of land vehicles and aircraft of all types, and in which in this respect all major demanded features of the layer are optimized simultaneously. In this respect, the manufacture should be substantially simplified in comparison with the prior art and the number of required process steps in manufacture should be reduced to a minimum. Furthermore, it is an object of the invention to provide a corresponding thermally coated substrate, in particular a brake disk for an aircraft or a land vehicle.

The subject matters of the invention satisfying these objects are characterized by the features of the independent claims 1 and 6.

The respective dependent claims relate to particularly advantageous embodiments of the invention.

The invention thus relates to a spray powder with a superferritic iron-based compound for the thermal coating of a substrate, wherein the spray powder includes, apart from impurities, a chemical element from the list of chemical elements consisting of C, Mn, Cr, Mo, Ni, Nb, P, S, Si, Fe, Al, O, and Zr. In accordance with the invention, the spray powder has the following chemical composition: C at a maximum up to 0.7% by weight, Mn at a maximum up to 0.7% by weight; Ni at a maximum up to 0.5% by weight, Nb at a maximum up to 1.2% by weight, P at a maximum up to 0.1% by weight, S at a maximum up to 0.1% by weight, Si at a maximum up to 0.2% by weight, Cr in the range from 20% to 40% by weight, Mo in the range 2.0% to 6% by weight, and a ceramic component $Al_2O_3/ZrO_2$ up to a maximum of 50% by weight, with the remainder being Fe, and otherwise a total of a maximum of 0.4% by weight of further chemical components being contained as impurities.

In this respect, the elements phosphorous (P) and sulfur (S) are present in such small quantities in particularly preferred embodiments of spray powders in accordance with the invention or in thermal spray layers in accordance with the invention that these chemical elements basically, just like the total of a maximum of 0.4% by weight of other elements, also have to be considered impurities since they make substantially no contribution to the positive properties of the thermal spray layers or of the thermal spray powder of the invention in very small concentrations such as P and S at a concentration of respectively less than 0.02% by weight. Furthermore, these elements are in principle also unwanted because they can, for example, already promote the formation of grain boundaries and can thus negatively influence the thermal spray layers in comparatively small concentrations, e-g. from 0.1% by weight or more.

It is a major finding of the invention that the thermal input into the substrate, which is preferably a solid brake disk without internal ventilation made of an AlSi alloy having SiC particles, can be considerably reduced by the use of a superferritic material, which is customarily understood as stainless steels with a ferritic structure and a relatively small carbon content, with an elevated chromium content in the spray powder which can lie in accordance with the invention between 20% to 40% by weight Cr. Damage to the substrate material by an elevated thermal input such as is to be feared on heavy braking of a vehicle can thereby be successfully prevented for the first time because the heat conductivity of the thermal spray layer is considerably reduced in comparison with the materials known from the prior art due to the relatively high chromium content.

It has moreover been shown that layers in accordance with the invention wear much less or more slowly under the same load so that, for example, the service lives of brake disks in accordance with the invention are substantially improved in comparison with the prior art and frequently even achieve operating lives or service lives such that a brake disk in accordance with the invention does not have to be replaced at all over the entire service life of the vehicle.

It has furthermore been shown that the thermal spray layers of the present invention have a much improved porosity of, for example, less than 2%, whereby the layers are, among other things, mechanically more stable and loadable and can have an improved hardness of up to 700 HV0.3 or even more.

In a preferred embodiment of a spray powder in accordance with the invention, the spray powder has the following composition:

C at a maximum up to 0.5%, preferably at a maximum up to 0.2% by weight,
Mn at a maximum up to 0.5%, preferably at a maximum up to 0.1% by weight,
Ni at a maximum up to 0.3%, preferably at a maximum up to 0.1% by weight,
Nb at a maximum up to 0.8%, preferably at a maximum up to 0.6% by weight,
P at a maximum up to 0.05%, preferably at a maximum up to 0.02% by weight,
S at a maximum up to 0.05%, preferably at a maximum up to 0.01% by weight,
Si at a maximum up to 0.15%, preferably at a maximum up to 0.1% by weight,
Cr in the range from 25% to 35% by weight,
Mo in the range 3.5% to 4.5% by weight, and the ceramic component $Al_2O_3/ZrO_2$ from 10% to a maximum of 40% by weight, with the remainder being Fe, except for a total of at a maximum 0.3% by weight of other elements as impurities.

In an embodiment particularly important for practice, a maximum of up to 0.017% by weight C is present in a spray powder in accordance with the invention; Cr is present in the range from 27.5% to 29.5% by weight, Mo in the range from 3.8% to 4.2% by weight, and the ceramic component $Al_2O_3/ZrO_2$ in the range 34% to 36%, preferably 35%, by weight.

In this respect, the ceramic component $Al_2O_3/ZrO_2$ contains between 60% and 90% by weight $Al_2O_3$ and between 10% and 40% by weight $ZrO_2$. In an embodiment particularly important for practice, the ceramic component $Al_2O_3/ZrO_2$ contains between 75% and 85%, preferably 80% by weight $Al_2O_3$ and between 15% and 25%, preferably 20% by weight, $ZrO_2$. This means that, if e.g. 35% by weight of the ceramic component $Al_2O_3/ZrO_2$ is contained in the spray powder and if the ceramic component $Al_2O_3/ZrO_2$ contains 80% by weight, $Al_2O_3$ and 20% by weight $ZrO_2$, a total of 28% by weight of $Al_2O_3$ is contained in the spray powder and a total of 7% by weight of $ZrO_2$ is contained in the spray powder.

A nominal particle size of the spray powder is in this respect preferably in the range $-16$ μm to $+11$ μm; wherein the previously used nomenclature for the particle size is to be understood in the usual manner for the skilled person. As usual, for example, a particle size range from $-16$ μm to $+11$ μm thus means that the particles are larger than 11 μm and smaller than 16 μm. It is self-explanatory in this respect that a spray powder in accordance with the invention can also have very different particle sizes or particle size distributions depending on the use and depending on which specific layer parameters are required of a thermal spray layer to be sprayed.

The invention further relates to a substrate with a thermal spray layer made from a superferritic iron-based compound, wherein the thermal spray layer includes, apart from impurities, a chemical element from the list of chemical elements consisting of C, Mn, Cr, Mo, Ni, Nb, P, S, Si, Fe, Al, O and Zr, characterized in that the thermal spray layer has the following chemical composition: C at a maximum up to 0.7% by weight, Mn at a maximum up to 0.7% by weight; Ni at a maximum up to 0.5% by weight, Nb at a maximum up to 1.2% by weight, P at a maximum up to 0.1% by weight, S at a maximum up to 0.1% by weight, Si at a maximum up to 0.2% by weight, Cr in the range from 20% to 40% by weight, Mo in the range 2.0% to 6% by weight, and a ceramic component $Al_2O_3/ZrO_2$ up to a maximum of 50% by weight, the remainder Fe, with additionally a total of a maximum of 0.4% by weight of further chemical components being able to be contained as impurities.

In a special embodiment, the thermal spray layer of a substrate in accordance with the invention has the following composition:

C at a maximum up to 0.5%, preferably at a maximum up to 0.2% by weight,
Mn at a maximum up to 0.5%, preferably at a maximum up to 0.1% by weight,
Ni at a maximum up to 0.3%, preferably at a maximum up to 0.1% by weight,
Nb at a maximum up to 0.8%, preferably at a maximum up to 0.6% by weight
P at a maximum up to 0.05%, preferably at a maximum up to 0.02% by weight,
S at a maximum up to 0.05%, preferably at a maximum up to 0.01% by weight,
Si at a maximum up to 0.15%, preferably at a maximum up to 0.1% by weight, Cr in the range from 25% to 35% by weight, Mo in the range 3.5% to 4.5% by weight and the ceramic component $Al_2O_3/ZrO_2$ from 10% to a maximum of 40% by weight, remainder Fe, with additionally a total of a maximum of 0.3% by weight of other elements being able to be contained as impurities.

In an embodiment particularly important for practice, the thermal spray layer of a substrate in accordance with the invention has the following composition: C at a maximum up to 0.017% by weight, Cr in the range from 27.5% to 29.5% by weight, Mo in the range from 3.8% to 4.2% by weight and the ceramic component $Al_2O_3/ZrO_2$ in the range 34% to 36%, preferably 35% by weight, remainder Fe.

In this respect, the ceramic component $Al_2O_3/ZrO_2$ itself can contain between 60% and 90% by weight $Al_2O_3$ and between 10% and 40% by weight $ZrO_2$; the ceramic component $Al_2O_3/ZrO_2$ itself can specifically contain between 75% and 85%, preferably 80%, by weight $Al_2O_3$ and between 15% and 25%, preferably 20%, by weight $ZrO_2$.

The thermal spray layer is in this respect in practice preferably a compound layer of a matrix containing metal and having inclusions including the ceramic component $Al_2O_3/ZrO_2$.

The porosity of the thermal spray layer is in this respect less than 5%, preferably less than 2%, and/or has a microhardness between 300 HV.03 and 1000 HV.03, preferably between 500 HV0.3 and 700 HV0.3 and/or a layer thickness of the thermal spray layer is between 50 μm and 500 μm, preferably between 100 μm and 300 μm.

The substrate includes e.g. aluminum, in particular an aluminum alloy or is made more or less completely of aluminum. In practice, this is a substrate particularly preferably made from an AlSi alloy having SiC particles for strengthening, wherein the substrate is specifically a brake disk for a vehicle, in particular for a motor vehicle or for an aircraft.

In special cases, when a still better adhesive strength is required between the superferritic thermal spray layer and the substrate, an adhesive layer, made for example from Ni/Al and/or from Ni/Cr or from another adhesive layer material known per se can be provided on the substrate between the superferritic thermal spray layer and the substrate.

The superferritic thermal spray layer and/or the adhesive layer is/are in this respect preferably manufactured using a powder flame spraying process, in particular a high-velocity frame spraying process or a plasma spraying process.

Finally, in the following, test results with respect to the present invention will be reported such as were achieved in the coating of a brake disk for a motor vehicle.

In the following table 1, a chemical composition of the superferritic iron-based compound without the ceramic component is set forth by way of example for a particularly preferred embodiment of a spray powder in accordance with the invention which has proven its exceptional value in tests on brake disks made from a substrate of an AlSO alloy having SiC particles. All percentage figures are in this respect weight percentages.

The corresponding spray powder in accordance with the invention was then formed in that 35% by weight of the total of 66.6% by weight of the iron in accordance with Table 1 was replaced with 35% of the ceramic component $Al_2O_3/ZrO_2$ so that the finished spray powder, which was used for coating the brake disk in the aforesaid test, only contains 31.6% Fe and instead 35% by weight of the ceramic component $Al_2O_3/ZrO_2$.

Solid brake disks without internal ventilation made from an AlSi alloy having SiC particles were coated in tests using the spray powder which was formed, as described further above, from the superferritic iron-based compound in accordance with Table 1 and from the ceramic component $Al_2O_3/ZrO_2$. The diameters of the brake disk substrates were between 250 mm and 300 mm.

The surface of the substrate was pretreated, that is activated, by sandblasting, whereby a roughness $R_a$ of approximately 4-8 μm was reached on the substrate surface. The thermal superferritic spray layer in accordance with the present invention was sprayed directly onto the pretreated substrate surface without an adhesive layer by means of atmospheric plasma spraying. A TriplexPro-200 torch of the applicant, Sulzer Metco, was used as the plasma spraying apparatus. An Ar/He mix was used as the process gas. The powder conveying rate amounts to 120 g/min, with Ar being used as the carrier gas. The application efficiency of the spray process was larger than 70%. After the coating, the coated substrates were posttreated, in particular ground, in a manner known per se.

Thermal spray layers were able to be produced on the brake disk substrates using these process parameters which had a porosity of less than 2% and a microhardness in the range from 500 HV0.3 to 700 HV0.3 with a coating thickness in the ground state between 100 μm and 300 μm.

Similarly good results are possible by using a powder flame spraying process, e.g. using $C_2H_2/O_2$ mixtures, or when using a Triplex-APS torch of the company Sulzer Metco using $Ar/H_2$ mixtures. The use of a Triplex-APS with Ar/He gas mixtures and conveying rates up to 300 g/min and more is also possible. As is the use of a single-cathode APS torch with $Ar/H_2$ or $N_2/H_2$ gas mixtures.

Depending on the use and demands, an adhesive layer, particularly preferably made from Ni/Al or of NiCr, can also be provided on the substrate surface, for example, between a thermal superferritic spray layer of the present invention and the substrate, whereby the adhesion of the thermal superferritic spray layer can be even further improved for special loads. The adhesive layer is in this respect preferably likewise applied by a thermal spray process.

In this respect, the spray layer of the substrate in accordance with the invention can also contain, in addition to the named technically important chemical components, the impurities P and S already named in the description of the spray powder as well as still further technically unimportant impurities which were collected by way of example, but not exclusively, under the abbreviation TAO in Table 1.

In addition to those impurities which, of the corresponding impurities, are always unavoidable in practice in the

TABLE 1

Composition of the superferritic iron-based compound without the ceramic component. T.A.O. stands for all other impurities.

| C | Cr | Fe | Mn | Mo | Nb | Ni | P | S | Si | T.A.O |
|---|---|---|---|---|---|---|---|---|---|---|
| 0.017% | 28.3% | 66.6% | 0.1% | 3.9% | 0.6 | 0.1 | <0.02 | <0.01 | 0.1 | <0.3 | manufacture of the spray powder, the thermal spray layer of a substrate in accordance with the invention can e.g. also contain, apart from the ceramic component, e.g. also bound or unbound oxygen to a small degree, quantities of process gases such as Ar, He, N, etc. which are technically irrelevant for the essential properties of the spray layer and which can enter into the spray layer in the thermal spraying process, for example, by oxidation of one or more components of the spray powder or in another manner and can be bound there. The skilled person will understand that such and similar impurities can never be completely excluded in practice, but can be limited with a suitable process management such that they do not influence the essential properties of the thermal spray powder or of the thermal spray layer sprayed therewith from a technical aspect and from a practical aspect.

It is therefore also understood in this respect that, depending on which spray process is selected for producing the spray layer in accordance with the invention, further marginal impurities not named can also enter into the layer through the spraying process itself. It is thus possible, for example, that on the use of an HVOF process in which, for example, kerosene or another organic or inorganic fuel can be combusted for producing the thermal energy, very small quantities of carbon from the fuel can additionally enter into the layer.

The skilled person easily understands that the invention also includes all further combinations, not explicitly discussed, of embodiments in accordance with the invention as well as simple further developments of the invention.

The invention claimed is:

1. A spray powder for thermal spray coating comprising a superferritic iron-based compound and a ceramic component comprising $Al_2O_3$ and $ZrO_2$;
   said superferritic iron-based compound having C, Mn, Cr, Mo, Ni, Nb, P, S, Si, Fe, Al, O, and Zr, wherein amounts are:
   C at a maximum up to 0.7% by weight;
   Mn at a maximum up to 0.7% by weight;
   Ni at a maximum up to 0.5% by weight;
   Nb at a maximum up to 1.2% by weight;
   P at a maximum up to 0.1% by weight;
   S at a maximum up to 0.1% by weight;
   Si at a maximum up to 0.2% by weight;
   Cr in the range from 20% to 40% by weight;
   Mo in the range 2.0% to 6% by weight;
   a remainder of Fe; and
   a total of a maximum of 0.4% by weight of impurities; and
   said ceramic component comprising $Al_2O_3$ and $ZrO_2$ being in an amount of up to a maximum of 50% by weight of said spray powder,
   wherein the ceramic component comprising $Al_2O_3$ and $ZrO_2$ contains between 60% and 90% by weight $Al_2O_3$ and between 10% and 40% by weight $ZrO_2$.

2. The spray powder of clam 1, wherein said amounts are:
   C at a maximum up to 0.5%;
   Mn at a maximum up to 0.5%;
   Ni at a maximum up to 0.3%;
   Nb at a maximum up to 0.8%;
   P at a maximum up to 0.05%;
   S at a maximum up to 0.05%;
   Si at a maximum up to 0.15%;
   Cr in the range from 25% to 35% by weight;
   Mo in the range 3.5% to 4.5% by weight; and
   a remainder of Fe;
   a total of a maximum of 0.3% by weight of impurities; and
   said ceramic component comprising $Al_2O_3$ and $ZrO_2$ is from 10% up to a maximum of 40% by weight.

3. The spray powder of claim 1, wherein said amounts are:
   C at a maximum up to 0.017% by weight;
   Cr in the range from 27.5% to 29.5% by weight;
   Mo in the range 3.8% to 4.2% by weight; and
   a remainder of Fe; and
   the ceramic component comprising $Al_2O_3$ and $ZrO_2$ is in range 34% to 36%.

4. The spray powder of claim 1, wherein the ceramic component comprising $Al_2O_3$ and $ZrO_2$ contains between 75% and 85%, by weight $Al_2O_3$ and between 15% and 25%, by weight $ZrO_2$.

5. A substrate with a thermal spray layer that comprises a superferritic iron-based compound and a ceramic component comprising $Al_2O_3$ and $ZrO_2$;
   said superferritic iron-based compound having C, Mn, Cr, Mo, Ni, Nb, P, S, Si, Fe, Al, O and Zr, wherein amounts are:
   C at a maximum up to 0.7% by weight;
   Mn at a maximum up to 0.7% by weight;
   Ni at a maximum up to 0.5% by weight;
   Nb at a maximum up to 1.2% by weight;
   P at a maximum up to 0.1% by weight;
   S at a maximum up to 0.1% by weight;
   Si at a maximum up to 0.2% by weight;
   Cr in the range from 20% to 40% by weight;
   Mo in the range 2.0% to 6% by weight;
   a remainder of Fe; and
   a total of a maximum of 0.4% by weight of impurities; and
   said ceramic component comprising $Al_2O_3$ and $ZrO_2$ being in an amount of up to a maximum of 50% by weight of said thermal spray layer,
   wherein the ceramic component comprising $Al_2O_3$ and $ZrO_2$ contains between 60% and 90% by weight $Al_2O_3$ and between 10% and 40% by weight $ZrO_2$.

6. The substrate of claim 5, wherein said amounts are:
   C at a maximum up to 0.5%;
   Mn at a maximum up to 0.5%;
   Ni at a maximum up to 0.3%;
   Nb at a maximum up to 0.8%;
   P at a maximum up to 0.05%;
   S at a maximum up to 0.05%;
   Si at a maximum up to 0.15%;
   Cr in the range from 25% to 35% by weight;
   Mo in the range 3.5% to 4.5% by weight; and
   a remainder of Fe;
   a total of a maximum of 0.3% by weight of impurities; and
   said ceramic component comprising $Al_2O_3$ and $ZrO_2$ is from 10% up to a maximum of 40% by weight.

7. The substrate of claim 5, wherein said amounts are:
   C at a maximum up to 0.017% by weight;
   Cr in the range from 27.5% to 29.5% by weight;
   Mo in the range 3.8% to 4.2% by weight; and
   a remainder of Fe; and
   the ceramic component comprising $Al_2O_3$ and $ZrO_2$ is in the range 34% to 36%.

8. The substrate of claim 7, wherein the ceramic component comprising $Al_2O_3$ and $ZrO_2$ contains between 75% and 85%, by weight $Al_2O_3$ and between 15% and 25%, by weight $ZrO_2$.

9. The substrate of claim 5, wherein the thermal spray layer is a compound layer of a matrix containing metal and having inclusions including the ceramic component comprising $Al_2O_3$ and $ZrO_2$.

10. The substrate of claim 5, wherein a porosity of the thermal spray layer is less than 5%.

11. The substrate of claim 5, wherein a microhardness of the thermal spray layer is between 300 HV.03 and 1000 HV.03.

12. The substrate of claim 5, wherein a thickness of the thermal spray layer is between 50 µm and 500 µm.

13. The substrate of claim 5, wherein the substrate includes aluminum or an aluminum alloy.

14. The substrate of claim 5, wherein the substrate is a brake disk.

15. The substrate of claim 14, wherein the brake disk is a vehicle or motor vehicle brake disk.

16. The substrate of claim 5, further comprising an adhesive layer arranged between the thermal spray layer and the substrate, wherein the adhesive layer comprises at least one of:
   Ni and Al; and/or
   Ni and Cr.

17. The substrate of claim 5, wherein the thermal spray layer is one of:
   a thermal spray layer applied by a powder flame spraying process;
   a thermal spray layer applied by a high-velocity powder flame spraying process; or
   a thermal spray layer applied by a plasma spraying process.

18. A thermal spray coating layer arranged on a substrate and comprising a superferritic iron-based metal matrix and inclusions of ceramic component comprising $Al_2O_3$ and $ZrO_2$;
   said superferritic iron-based metal matrix that includes only elements from the following: C, Mn, Cr, Mo, Ni, Nb, P, S, Si, Fe, Al, O and Zr,
   wherein amounts of the elements are:
   C at a maximum up to 0.7% by weight;
   Mn at a maximum up to 0.7% by weight;
   Ni at a maximum up to 0.5% by weight;
   Nb at a maximum up to 1.2% by weight;
   P at a maximum up to 0.1% by weight;
   S at a maximum up to 0.1% by weight;
   Si at a maximum up to 0.2% by weight;
   Cr in the range from 20% to 40% by weight;
   Mo in the range 2.0% to 6% by weight;
   a remainder of Fe; and
   a total of a maximum of 0.4% by weight of impurities that include elements Al, O and Zr; and
   said inclusions of ceramic component comprising $Al_2O_3$ and $ZrO_2$ being in an amount of up to a maximum of 50% by weight of said thermal spray coating layer,
   wherein the ceramic component comprising $Al_2O_3$ and $ZrO_2$ contains between 60% and 90% by weight $Al_2O_3$ and between 10% and 40% by weight $ZrO_2$.

* * * * *